United States Patent
Sato et al.

(10) Patent No.: US 11,280,385 B2
(45) Date of Patent: Mar. 22, 2022

(54) TRANSFER BELT

(71) Applicant: AISIN CORPORATION, Kariya (JP)

(72) Inventors: Yuki Sato, Nishio (JP); Kenji Kawano, Nukata (JP); Akira Ochi, Anjo (JP); Ryo Nakamura, Anjo (JP); Takayuki Miyake, Nukata (JP); Junichi Tokunaga, Anjo (JP); Masashi Hattori, Anjo (JP)

(73) Assignee: AISIN CORPORATION, Kariya (JP)

( * ) Notice: Subject to any disclaimer, the term of this patent is extended or adjusted under 35 U.S.C. 154(b) by 245 days.

(21) Appl. No.: 16/066,088

(22) PCT Filed: Feb. 7, 2017

(86) PCT No.: PCT/JP2017/004410
§ 371 (c)(1),
(2) Date: Jun. 26, 2018

(87) PCT Pub. No.: WO2017/138528
PCT Pub. Date: Aug. 17, 2017

(65) Prior Publication Data
US 2019/0154113 A1  May 23, 2019

(30) Foreign Application Priority Data

Feb. 12, 2016 (JP) .............................. JP2016-025305
Apr. 28, 2016 (JP) .............................. JP2016-091361

(51) Int. Cl.
*F16G 5/16* (2006.01)
*F16G 5/00* (2006.01)
(Continued)

(52) U.S. Cl.
CPC ................ *F16G 5/16* (2013.01); *F16G 5/00* (2013.01); *F16H 9/04* (2013.01); *F16H 9/12* (2013.01)

(58) Field of Classification Search
CPC ..... F16G 5/00; F16G 5/16; F16G 5/18; F16G 5/166
(Continued)

(56) References Cited

U.S. PATENT DOCUMENTS 4,080,841 A * 3/1978 Vollers .................. F16G 5/16
474/201
4,525,160 A * 6/1985 Okawa .................. F16G 5/16
474/201
(Continued)

FOREIGN PATENT DOCUMENTS

JP  2000-065153 A  3/2000
JP  2006-153089 A  6/2006
(Continued)

OTHER PUBLICATIONS

Apr. 25, 2017 International Search Report issued in International Patent Application No. PCT/JP2017/004410.

*Primary Examiner* — Michael R Mansen
*Assistant Examiner* — Raveen J Dias
(74) *Attorney, Agent, or Firm* — Oliff PLC

(57) ABSTRACT

A transfer belt wound between a primary pulley and a secondary pulley of a continuously variable transmission, the transfer belt including: a plurality of elements, each of which has a body that includes a saddle surface and a pair of pillars that extend toward a radially outer side of the transfer belt from both sides of the saddle surface in a width direction; and a bind ring that binds the plurality of elements annularly with an inner peripheral surface of the bind ring contacting the saddle surface of each of the plurality of elements.

8 Claims, 8 Drawing Sheets

(51) Int. Cl.
*F16H 9/04* (2006.01)
*F16H 9/12* (2006.01)

(58) Field of Classification Search
USPC .......................................... 474/242, 201, 202
See application file for complete search history.

(56) References Cited

U.S. PATENT DOCUMENTS

| | | | | |
|---|---|---|---|---|
| 4,612,005 A * | 9/1986 | Miranti, Jr. | ............... | F16G 5/16 474/201 |
| 4,619,634 A * | 10/1986 | Nakawaki | ................. | F16G 5/16 474/201 |
| 4,824,424 A * | 4/1989 | Ide | ............................ | F16G 5/16 474/201 |
| 6,464,606 B2 * | 10/2002 | Brandsma | ................. | F16G 5/16 474/237 |
| 6,612,954 B2 * | 9/2003 | Akagi | ....................... | F16G 5/16 474/237 |
| 6,679,798 B1 * | 1/2004 | Takagi | ...................... | F16G 5/16 474/242 |
| 7,294,077 B2 * | 11/2007 | Wang | ........................ | F16G 5/16 156/137 |
| 8,870,695 B2 * | 10/2014 | Nishimi | .................... | F16G 5/16 474/242 |
| 2002/0137585 A1 * | 9/2002 | Smeets | ................... | F16G 5/163 474/242 |
| 2004/0053723 A1 * | 3/2004 | Smeets | ................... | F16G 5/163 474/242 |
| 2004/0082417 A1 * | 4/2004 | Smeets | .................... | F16G 5/16 474/242 |
| 2005/0101424 A1 * | 5/2005 | Van Der Sluis | .......... | F16G 5/16 474/242 |
| 2005/0144899 A1 * | 7/2005 | Tran | .......................... | F16G 5/16 52/749.1 |
| 2007/0072721 A1 * | 3/2007 | Takagi | ...................... | F16G 5/16 474/242 |
| 2009/0111633 A1 * | 4/2009 | Yagasaki | ................... | F16G 5/16 474/242 |
| 2009/0181814 A1 * | 7/2009 | Yagasaki | ................... | F16G 5/16 474/8 |
| 2011/0201467 A1 | 8/2011 | Kobayashi | | |
| 2011/0237376 A1 * | 9/2011 | Sano | ......................... | F16G 5/16 474/242 |
| 2011/0269591 A1 * | 11/2011 | Adomi | .................. | C23C 28/044 474/237 |
| 2012/0190490 A1 * | 7/2012 | Morino | ..................... | F16G 5/16 474/240 |
| 2015/0167781 A1 * | 6/2015 | Nishida | ..................... | C23C 8/24 148/238 |
| 2018/0023664 A1 * | 1/2018 | Bransma | ................... | F16G 5/16 474/8 |
| 2019/0154112 A1 * | 5/2019 | Ochi | ......................... | F16G 5/16 |
| 2019/0154114 A1 * | 5/2019 | Ochi | ......................... | F16G 5/16 |
| 2019/0195315 A1 * | 6/2019 | Ochi | ......................... | F16G 5/16 |
| 2019/0346016 A1 * | 11/2019 | Van Treijen | ............. | F16G 5/16 |
| 2020/0096078 A1 * | 3/2020 | Miyake | ..................... | F16G 5/16 |
| 2020/0109765 A1 * | 4/2020 | Ochi | ......................... | F16G 5/16 |
| 2020/0149610 A1 * | 5/2020 | Ochi | ......................... | F16G 5/16 |

FOREIGN PATENT DOCUMENTS

| | | |
|---|---|---|
| JP | 2009-197935 A | 9/2009 |
| JP | 2013-167284 A | 8/2013 |
| WO | 00/28237 A1 | 5/2000 |
| WO | 2009/078392 A1 | 6/2009 |
| WO | 2013/098403 A1 | 7/2013 |
| WO | 2015/063132 A1 | 5/2015 |

* cited by examiner

A-A SECTION

B-B SECTION

TRANSFER BELT

BACKGROUND

The disclosure according to the present disclosure disclosed herein relates to a transfer belt.

There has hitherto been proposed a transfer belt that includes an endless ring (bind ring) and a plurality of elements held on the ring and arranged in the circumferential direction of the ring. In the transfer belt, each of the elements includes a body portion that extends transversely (in the width direction) and pillar portions that extend upward (toward the radially outer side of the ring) from the left and right ends of the upper portion of the body portion (see Japanese Patent Application Publication No. 2006-153089, for example). Each of the elements described in Japanese Patent Application Publication No. 2006-153089 has a ring slot that holds the ring with the upper surface (saddle surface) of the body portion and the left and right pillar portions, and the saddle surface is formed as a convex curved surface curved downward (toward the radially inner side of the ring) as it extends from the center portion in the left-right direction constituting the top portion toward the left and the right. In addition, a rocking edge portion that extends transversely is provided on the front main surface of the body portion below (on the radially inner side of the ring with respect to) the saddle surface.

SUMMARY

In the element described in Japanese Patent Application Publication No. 2006-153089 in which the saddle surface is formed as a convex curved surface, the rocking edge portion is formed on the radially inner side of the ring with respect to the convex curved surface of the saddle surface. Therefore, a friction loss is increased due to sliding caused between the ring and the saddle surface when the element is swung (turned) by use of the rocking edge portion as a support point, which lowers the transfer efficiency of the transfer belt.

An exemplary aspect of the disclosure improves the transfer efficiency of a transfer belt that has elements in which a saddle surface is formed as a convex curved surface.

A transfer belt wound between a primary pulley and a secondary pulley of a continuously variable transmission according to an exemplary aspect of the disclosure includes a plurality of elements, each of which has a body that includes a saddle surface and a pair of pillars that extend toward a radially outer side of the transfer belt from both sides of the saddle surface in a width direction; and a bind ring that binds the plurality of elements annularly with an inner peripheral surface of the bind ring contacting the saddle surface of each of the plurality of elements, wherein: the saddle surface is formed as a convex curved surface curved convexly toward the radially outer side of the transfer belt; a rocking edge is formed in both the pair of pillars so as to extend in the width direction and serve as a support point during turning motion of the element in contact with an adjacent element; the rocking edge has a width in a radial direction of the transfer belt; and a top of the convex curved surface of the saddle surface is formed so as to be positioned in a range of the width of the rocking edge in the radial direction.

In the transfer belt according to the present disclosure, the saddle surface which is contacted by the inner peripheral surface of the bind ring is formed as a convex curved surface curved convexly toward the radially outer side of the transfer belt, and the rocking edge which serves as a support point for turning motion of the element is formed so as to have a width in the radial direction of the transfer belt. The top of the convex curved surface of the saddle surface is formed so as to be positioned in the range of the width of the rocking edge in the radial direction. In the case where the saddle surface is formed as a convex curved surface, a normal reaction received by the bind ring from the saddle surface of the element which is wound around the primary pulley or the secondary pulley is maximum at the top of the convex curved surface, and thus the friction force between the saddle surface and the inner peripheral surface of the bind ring is also maximum at the top of the convex curved surface. Therefore, if the bind ring slips at the top of the saddle surface, the friction loss is increased to degrade the transfer efficiency of the transfer belt. In the transfer belt according to the present disclosure, the rocking edge is formed so as to have a width in the radial direction of the transfer belt, and the top of the convex curved surface of the saddle surface is formed so as to be positioned in the range of the width of the rocking edge in the radial direction. Therefore, sliding between the top of the saddle surface and the bind ring can be reduced. As a result, the transfer efficiency of the transfer belt can be further improved.

DETAILED DESCRIPTION OF EMBODIMENTS

Now, embodiments of the disclosure according to the present disclosure will be described.

Figure 1:
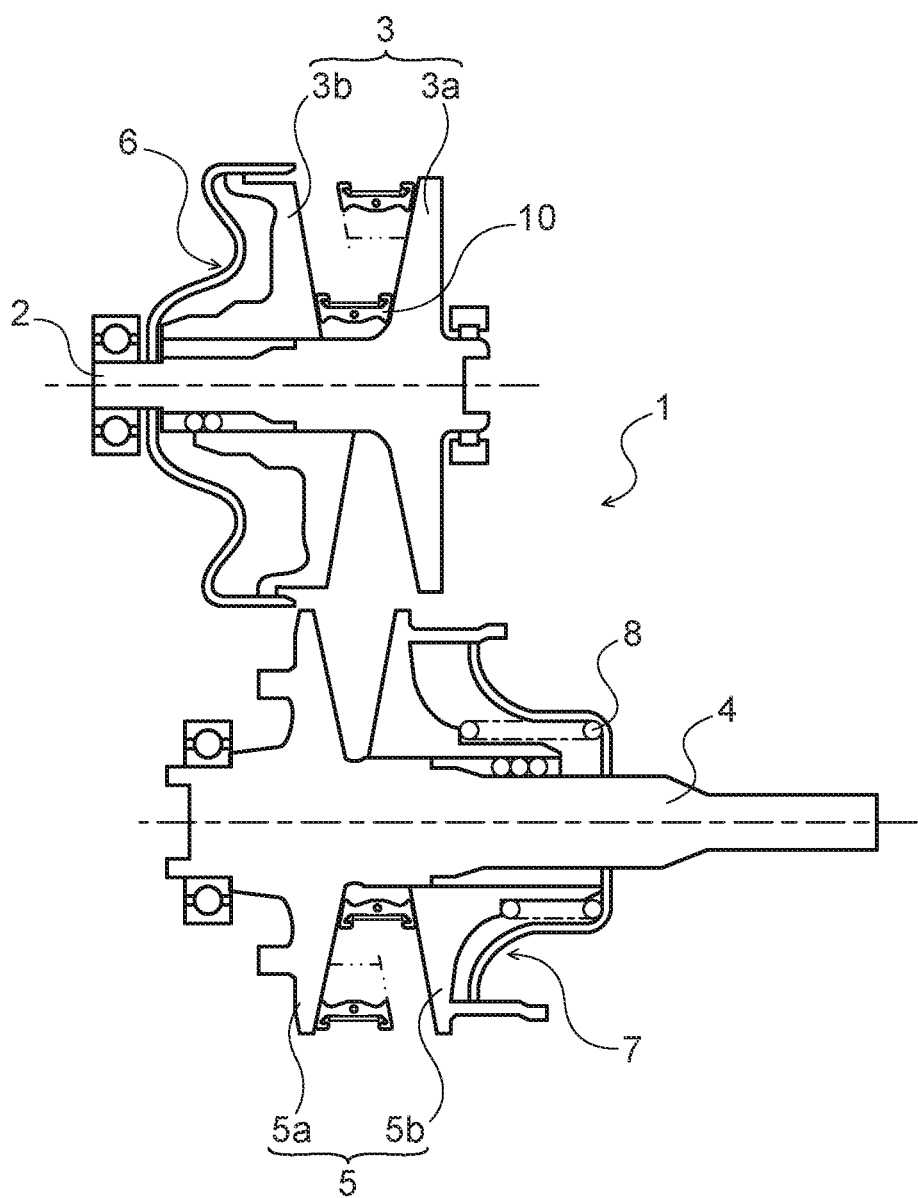
FIG. 1 illustrates a schematic configuration of a continuously variable transmission that includes a transfer belt according to the disclosure of the present disclosure.

FIG. 1 illustrates a schematic configuration of a continuously variable transmission 1 that includes a transfer belt 10 according to the present disclosure. The continuously variable transmission 1 is mounted on a vehicle that includes a power source such as an engine. As illustrated in the drawing, the continuously variable transmission 1 includes a primary shaft 2 that serves as a drive side rotary shaft, a primary pulley 3 provided on the primary shaft 2, a secondary shaft 4 that serves as a driven side rotary shaft disposed in parallel with the primary shaft 2, a secondary pulley 5 provided on the secondary shaft 4, and the transfer belt 10 which is wound between a pulley groove (V groove) of the primary pulley 3 and a pulley groove (V groove) of the secondary pulley 5.

The primary shaft 2 is coupled to an input shaft (not illustrated) coupled to the power source such as the engine via a forward/reverse switching mechanism (not illustrated). The primary pulley 3 has a fixed sheave 3*a* formed integrally with the primary shaft 2, and a movable sheave 3*b* supported so as to be slidable in the axial direction via a ball spline or the like on the primary shaft 2. Meanwhile, the secondary pulley 5 has a fixed sheave 5*a* formed integrally with the secondary shaft 4, and a movable sheave 5*b* supported so as to be slidable in the axial direction via a ball spline or the like on the secondary shaft 4 and urged in the axial direction by a return spring 8.

The continuously variable transmission 1 further has a primary cylinder 6 which is a hydraulic actuator that changes the groove width of the primary pulley 3, and a secondary cylinder 7 which is a hydraulic actuator that changes the groove width of the secondary pulley 5. The primary cylinder 6 is formed behind the movable sheave 3*b* of the primary pulley 3. The secondary cylinder 7 is formed behind the movable sheave 5*b* of the secondary pulley 5. Working oil is supplied from a hydraulic control device (not illustrated) to the primary cylinder 6 and the secondary cylinder 7 in order to vary the groove widths of the primary pulley 3 and the secondary pulley 5. This makes it possible to continuously vary the speed of torque transferred from the engine or the like to the primary shaft 2 via the input shaft and the forward/reverse switching mechanism and to output the resultant torque to the secondary shaft 4. The torque which is output to the secondary shaft 4 is transferred to drive wheels (neither of which is illustrated) of the vehicle via a gear mechanism (speed reduction gear), a differential gear, and drive shafts.

Figure 2:
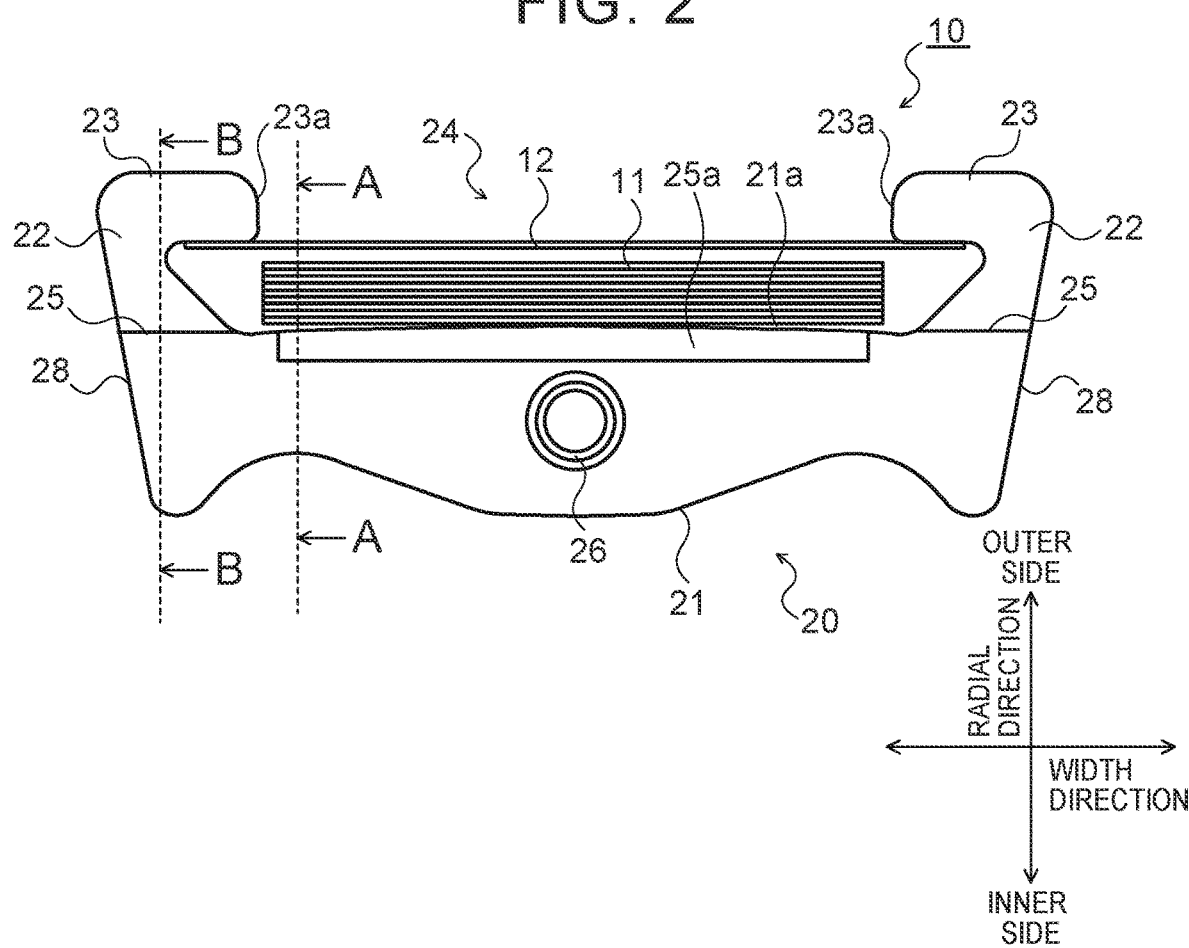
FIG. 2 is a front view of the transfer belt.
Figure 3A:
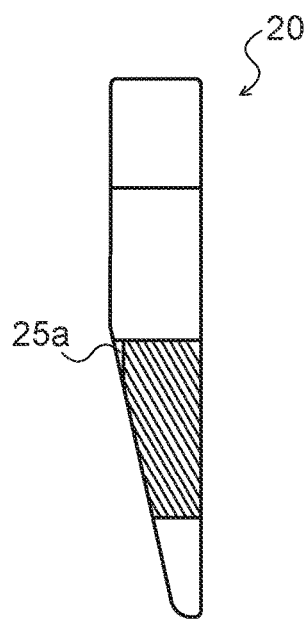
FIG. 3A is a sectional view illustrating the A-A section of FIG. 2.
Figure 3B:
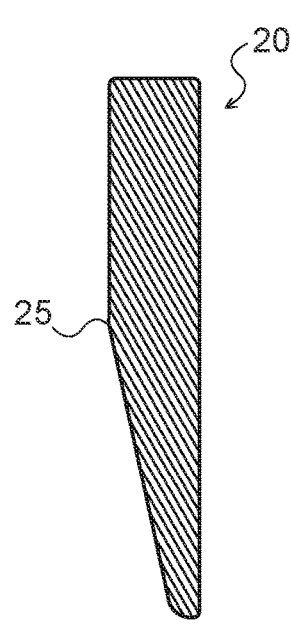
FIG. 3B is a sectional view illustrating the B-B section of FIG. 2.
Figure 4:
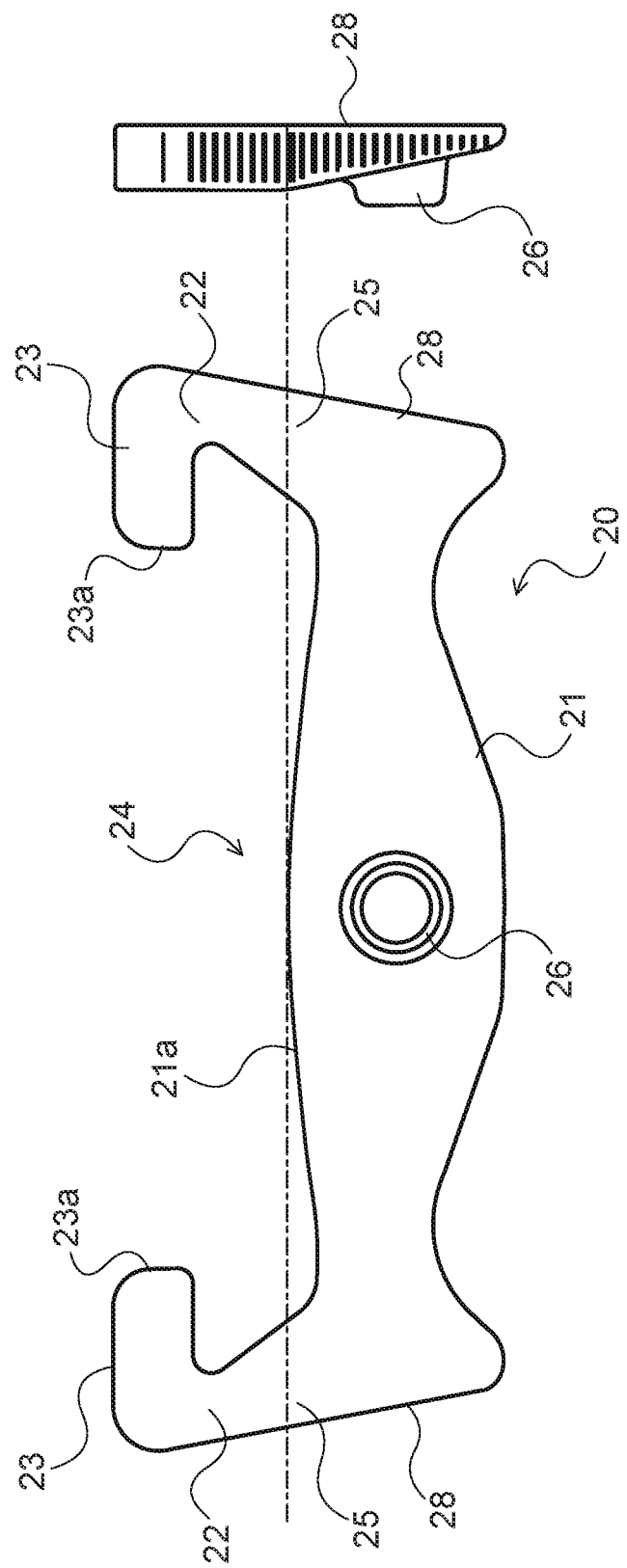
FIG. 4 is a front view and a side view of an element.
Figure 5:
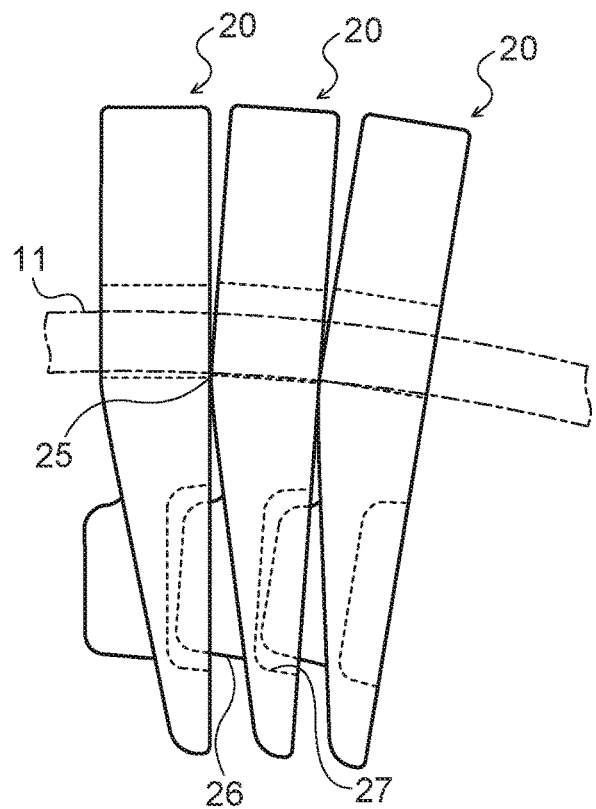
FIG. 5 is a side view of a plurality of elements bound by a bind ring.

FIG. 2 is a front view of the transfer belt 10. FIG. 3 illustrates the A-A section and the B-B section of FIG. 2. FIG. 4 is a front view and a side view of an element 20. FIG. 5 is a side view of a plurality of elements 20 bound by a bind ring 11. As illustrated in FIG. 2, the transfer belt 10 includes the bind ring (stacked ring) 11 and a multiplicity of (e.g. several hundreds of) elements 20, and is constituted by binding the multiple elements 20 annularly using the bind ring 11. The transfer belt 10 also includes a retainer ring 12 that holds the bind ring 11 so as not to slip off from the elements 20.

As illustrated in FIG. 2, the bind ring 11 is constituted by stacking a plurality of (e.g. nine) band-like rings (single rings), which are cut out from a drum made of a steel sheet, into a layer structure from the inner side toward the outer side in the radial direction. The bind ring 11 is formed in a so-called crowning shape gently inclined downward in the drawing from the center portion (i.e., center) in the width direction as the top portion (i.e., top) toward the outer side in the width direction. As illustrated in FIG. 2, the retainer ring 12 is formed as a band-like ring cut out from a drum made of a steel sheet and having a width that is larger than that of the bind ring 11 and a circumferential length that is longer than that of the bind ring 11, and disposed on the radially outer side (upper side in the drawing) with respect to the bind ring 11.

Each of the elements 20 has been stamped out from a steel sheet by pressing, for example. As illustrated in FIG. 2, the element 20 has a body portion 21 (i.e., body) that extends in the width direction, a pair of left and right pillar portions 22 (i.e., pillar portions) that extend from both end portions, in the width direction (left-right direction in the drawing), of the body portion 21 toward the radially outer side (upper side in the drawing), and a pair of left and right hook portions 23 that extend from extended end portions of the pair of left and right pillar portions 22 toward the inner side (center in the drawing) in the width direction. Left and right side surfaces 28 of the element 20 are formed so as to become smaller in width from the radially outer side (upper side in the drawing) toward the radially inner side (lower side in the drawing), and form a torque transfer surface (flank surface) that contacts the V groove of the primary pulley 3 or the V groove of the secondary pulley 5 to transfer torque.

As illustrated in FIGS. 2 and 4, in addition, the element 20 is provided with a slot 24 formed by an end surface of the body portion 21 on the radially outer side (upper side in the drawing) and end surfaces of the pair of pillar portions 22 on the inner side in the width direction to open on the radially outer side (upper side in the drawing) in a recessed shape. The elements 20 are bound annularly with the bind ring 11 fitted in the slots 24. The end surface of the body portion 21 on the radially outer side (upper side in the drawing) constitutes a saddle surface 21*a* contacted by the inner peripheral surface (the inner peripheral surface of an innermost ring disposed on the innermost peripheral side) of the bind ring 11. The saddle surface 21*a* is formed in a so-called crowning shape gently inclined downward in the drawing from the center portion in the width direction as the top portion toward the outer side in the width direction. Crowning of the bind ring 11 discussed above is formed such that the curvature thereof is smaller than that of the crowning of the saddle surface 21*a*. In FIG. 4, in order to facilitate understanding, the crowning of the saddle surface 21*a* is illustrated with an exaggerated curvature.

The slot 24 has an opening width reduced by the pair of hook portions 23 which extend toward the inner side in the width direction from the extended end portions of the pair of pillar portions 22 which constitute both end portions of the slot 24. The opening width (the distance between distal end portions 23*a* in the direction of extension of the pair of hook portions 23) of the slot 24 is larger than the width of the bind ring 11, and smaller than the width of the retainer ring 12. Consequently, the retainer ring 12 functions as a retainer that prevents the bind ring 11 from slipping out of the slot 24. The retainer ring 12 is fitted into the slot 24 while being warped in the width direction after the bind ring 11 is fitted into the slot 24. A long hole (not illustrated) in the circumferential direction is formed in the retainer ring 12, so that the retainer ring 12 is easily warped in the width direction.

As illustrated in FIGS. 3 and 4, in addition, the element 20 is formed so as to have a generally uniform plate thickness on the radially outer side (upper side in the drawing), and formed such that the plate thickness becomes gradually smaller from a predetermined position toward the radially inner side (lower side in the drawing). A boundary portion at which the plate thickness is varied on the front surface of the element 20 is connected by an arc. The arcuate portion constitutes a rocking edge portion 25 (i.e., rocking edge) that contacts the rear surface of the element 20 on the front side in the belt advancing direction. Each of the elements 20 which constitute the transfer belt 10 is swung (turned) in the circumferential direction with the rocking edge portion 25 as a support point when the element 20 exits a portion wound around the primary pulley 3 or a portion wound around the secondary pulley 5 into a chord portion between the pulleys or enters such a wound portion from the chord portion. As illustrated in FIG. 5, the element 20 is provided with a projecting portion 26 formed on a surface (front surface) on the front side in the belt advancing direction to project forward, and a recessed portion 27 formed in a surface (back surface) on the rear side in the belt advancing direction to be freely fitted with the projecting portion of an adjacent element 20, so that the state of arrangement of the elements 20 is kept.

Figure 6:
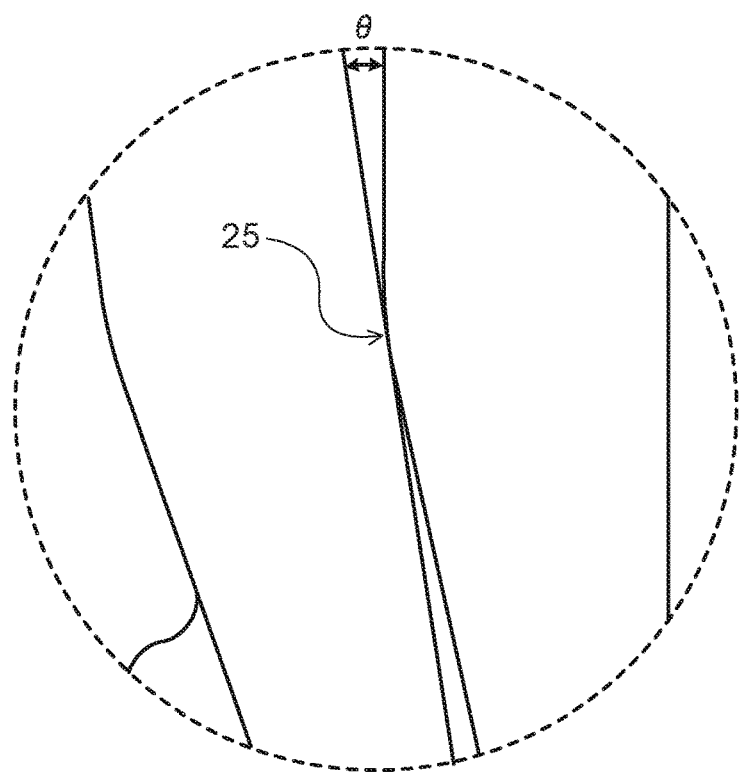
FIG. 6 is an enlarged partial view of the element with a rocking edge portion at the center.

The rocking edge portion 25 is formed in an arcuate shape as viewed in a side surface, and so as to be positioned on a virtual line that extends in the width direction through the top portion of the saddle surface 21a as viewed in plan. That is, the rocking edge portion 25 is formed at substantially the same position as the position of the top portion of the saddle surface 21a in the up-down direction of the element 20. FIG. 6 is an enlarged partial view of the element 20 with the rocking edge portion 25 at the center. As the winding diameter of the element 20 which is wound around the primary pulley 3 or the secondary pulley 5 becomes smaller, an angle θ formed between the adjacent elements 20 in the circumferential direction becomes larger, and the position (hereinafter referred to as an "actual rocking edge position") of a support point for swing motion in the circumferential direction is moved toward the radially inner side (lower side of the arc in the drawing). As the winding diameter of the element 20 becomes larger, on the other hand, the angle θ formed between the adjacent elements 20 in the circumferential direction becomes smaller, and the actual rocking edge position is moved toward the radially outer side (upper side of the arc in the drawing).

Figure 7:
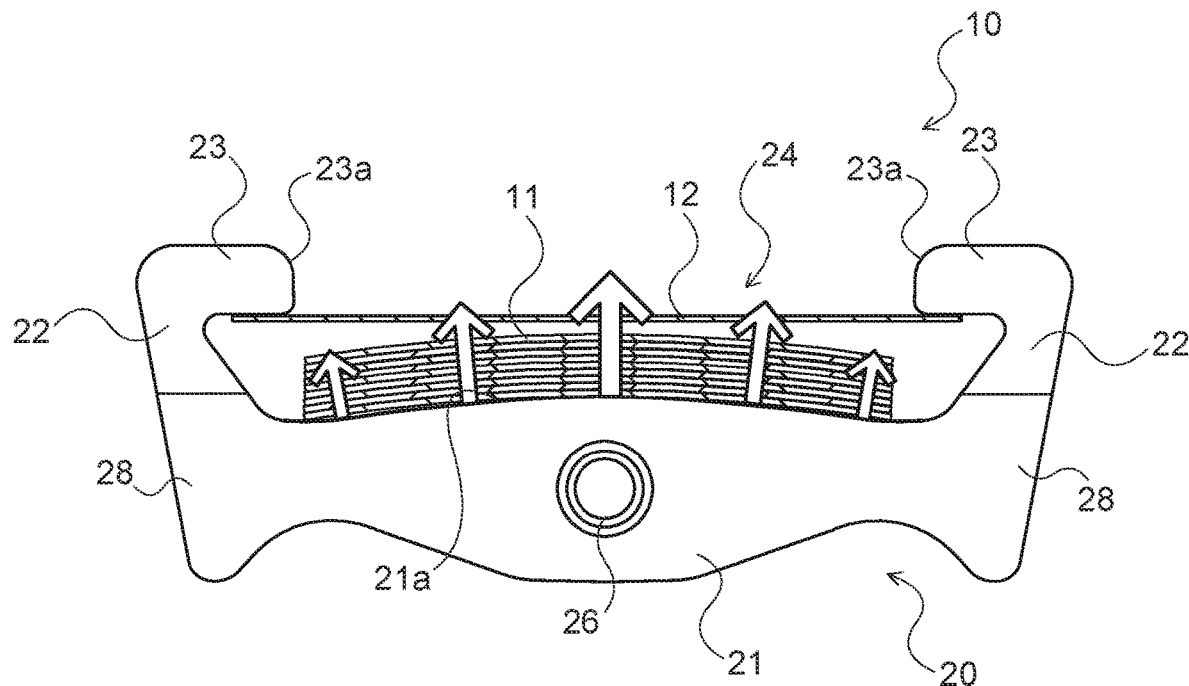
FIG. 7 illustrates a normal reaction received by the bind ring from a saddle surface.

FIG. 7 illustrates a normal reaction received by the bind ring 11 from the saddle surface 21a. The arrows in the drawing indicate a normal reaction received by the bind ring 11, and larger arrows indicate a larger normal reaction acting on the bind ring 11. As discussed above, the curvature of the crowning of the bind ring 11 is smaller than the curvature of the crowning of the saddle surface 21a, and thus the inner peripheral surface of the bind ring 11 (innermost peripheral ring) contacts only the top portion of the saddle surface 21a at the time with a low load when the tension which acts on the transfer belt 10 at a portion wound around the primary pulley 3 or the secondary pulley 5 is relatively small. As illustrated in FIG. 7, at the time with a high load when the tension which acts on the transfer belt 10 at a portion wound around the primary pulley 3 or the secondary pulley 5 is relatively large, the bind ring 11 is pressed against the saddle surface 21a by the tension, and tightly contacts the curved surface of the saddle surface 21a. A pressing force (normal reaction) received by the bind ring 11 from the saddle surface 21a is largest at a position at which the bind ring 11 contacts the top portion of the saddle surface 21a, and becomes smaller from the top portion of the saddle surface 21a toward the outer sides in the width direction. In addition, a friction force that acts on the inner peripheral surface of the bind ring 11 in the circumferential direction is proportional to the normal reaction which is received by the bind ring 11. Thus, similarly, the friction force is largest at a position at which the bind ring 11 contacts the top portion of the saddle surface 21a, and becomes smaller from the top portion of the saddle surface 21a toward the outer sides in the width direction. In the present embodiment, the distance between the top portion of the saddle surface 21a and the actual rocking edge position is reduced by forming the rocking edge portion 25 so as to be positioned on a virtual line that extends in the width direction through the top portion of the saddle surface 21. Consequently, slipping caused between the top portion of the saddle surface 21a and the bind ring 11 at the top portion of the saddle surface 21a can be reduced, and the transfer efficiency of the transfer belt 10 can be improved by reducing a friction loss between the inner peripheral surface of the bind ring 11 and the saddle surface 21a.

Figure 8:
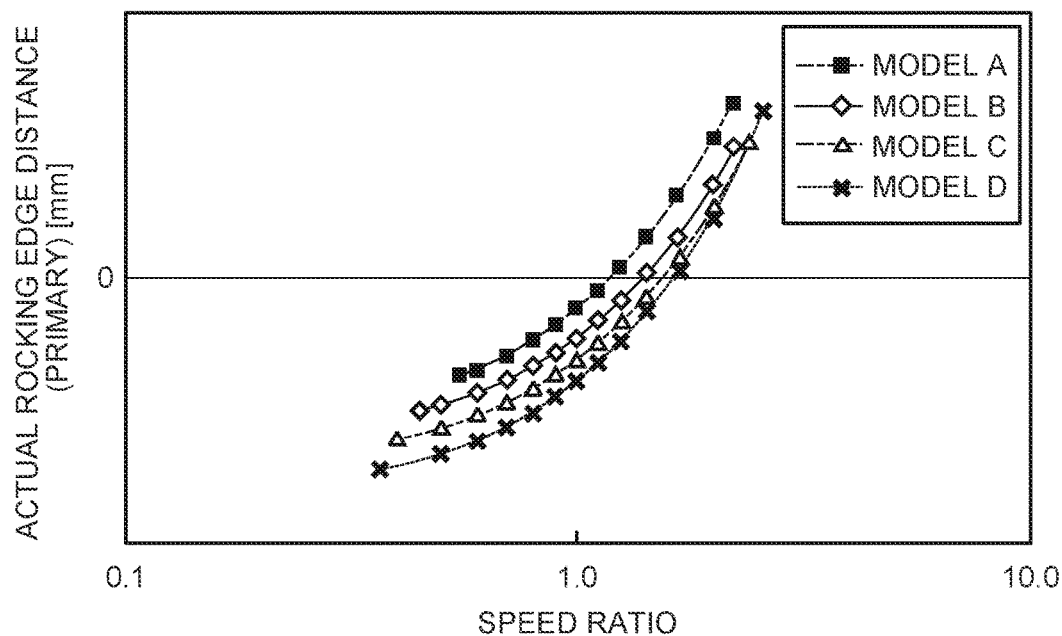
FIG. 8 illustrates the relationship between the speed ratio and the actual rocking edge distance for each model in the element which is wound around a primary pulley.
Figure 9:
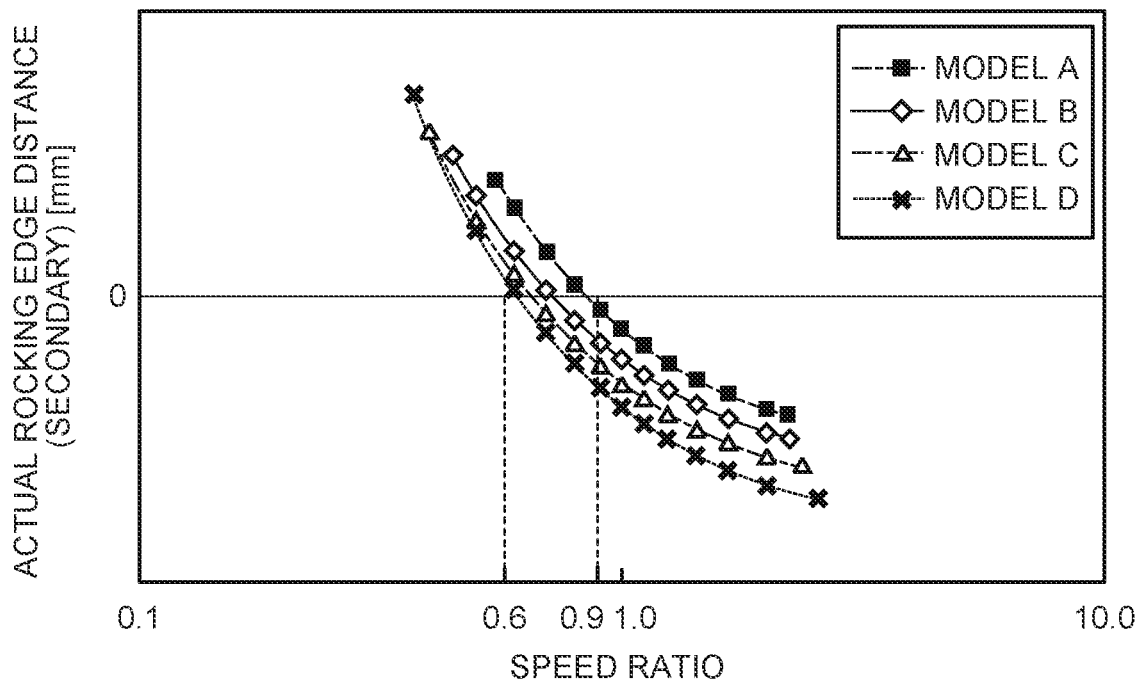
FIG. 9 illustrates the relationship between the speed ratio and the actual rocking edge distance for each model in the element which is wound around a secondary pulley.

FIG. 8 illustrates the relationship between the speed ratio and the actual rocking edge distance for each model in the element 20 which is wound around the primary pulley 3. FIG. 9 illustrates the relationship between the speed ratio and the actual rocking edge distance for each model in the element 20 which is wound around the secondary pulley 5. The speed ratio means the winding diameter of the secondary pulley 5 divided by the winding diameter of the primary pulley 3, that is, the speed reduction ratio. In the drawings, the horizontal axis (speed ratio) has a logarithmic scale, and the vertical axis (actual rocking edge distance) has a scale with equal intervals. In the drawings, in addition, models A to D are continuously variable transmissions with different distances (interaxial distances) between the primary pulley 3 and the secondary pulley 5 and different circumferential lengths (belt circumferential lengths) of the transfer belt 10. In the example of the drawings, the interaxial distance and the belt circumferential length of model A are the shortest, those of model B are the second shortest, those of model C are the third shortest, and those of model D are the longest. In models A to D, the same elements are used to constitute the transfer belts except that the number of elements used is different among the models A to D. In the drawings, in addition, when a position on a virtual line that extends in the width direction through the top portion of the saddle surface 21a in the rocking edge portion 25 is defined as a reference rocking edge position, the actual rocking edge distance indicates the distance from the reference rocking edge position to the actual rocking edge position. Whether the sign of the actual rocking edge distance in the drawings is positive or negative is determined such that the actual rocking edge position has a positive value when the actual rocking edge position is located on the radially inner side with respect to the reference rocking edge position, and such that the actual rocking edge position has a negative value when the actual rocking edge position is located on the radially outer side with respect to the reference rocking edge position.

The actual rocking edge position of each of the elements 20 which is wound around the primary pulley 3 is moved toward the radially inner side since the winding diameter of the primary pulley 3 becomes smaller as the speed ratio of the continuously variable transmission 1 becomes higher, and moved toward the radially outer side since the winding diameter of the primary pulley 3 becomes larger as the speed ratio becomes lower. In this case, as illustrated in FIG. 8, the actual rocking edge distance tends to become longer as the speed ratio becomes higher, and to become shorter as the speed ratio becomes lower. On the other hand, the actual rocking edge position of each of the elements 20 which is wound around the secondary pulley 5 is moved toward the radially outer side since the winding diameter of the secondary pulley 5 becomes larger as the speed ratio of the continuously variable transmission 1 becomes higher, and moved toward the radially inner side since the winding diameter of the secondary pulley 5 becomes smaller as the speed ratio becomes lower. In this case, as illustrated in FIG. 9, the actual rocking edge distance tends to become shorter as the speed ratio becomes higher, and to become longer as the speed ratio becomes lower. In this way, the actual rocking edge position (actual rocking edge distance) is varied in accordance with the speed ratio of the continuously variable transmission 1. As discussed above, the reference rocking edge position is a position on a virtual line that extends in the width direction through the top portion of the saddle surface 21a. Thus, sliding caused between the top portion of the saddle surface 21a and the bind ring 11 can be minimized when the support point (actual rocking edge position) for turning motion of the element 20 in the circumferential direction and the reference rocking edge position coincide with each other. Thus, the transfer efficiency of the transfer belt 10 becomes higher as the actual rocking edge position is brought closer to the reference rocking edge position, and becomes lower as the actual rocking edge position is brought away from the reference rocking edge position. In FIGS. 8 and 9, the transfer efficiency of the transfer belt 10 becomes higher as the actual rocking edge position is brought closer to a value of 0, and becomes lower as the actual rocking edge position is brought away from a value of 0.

Figure 10:
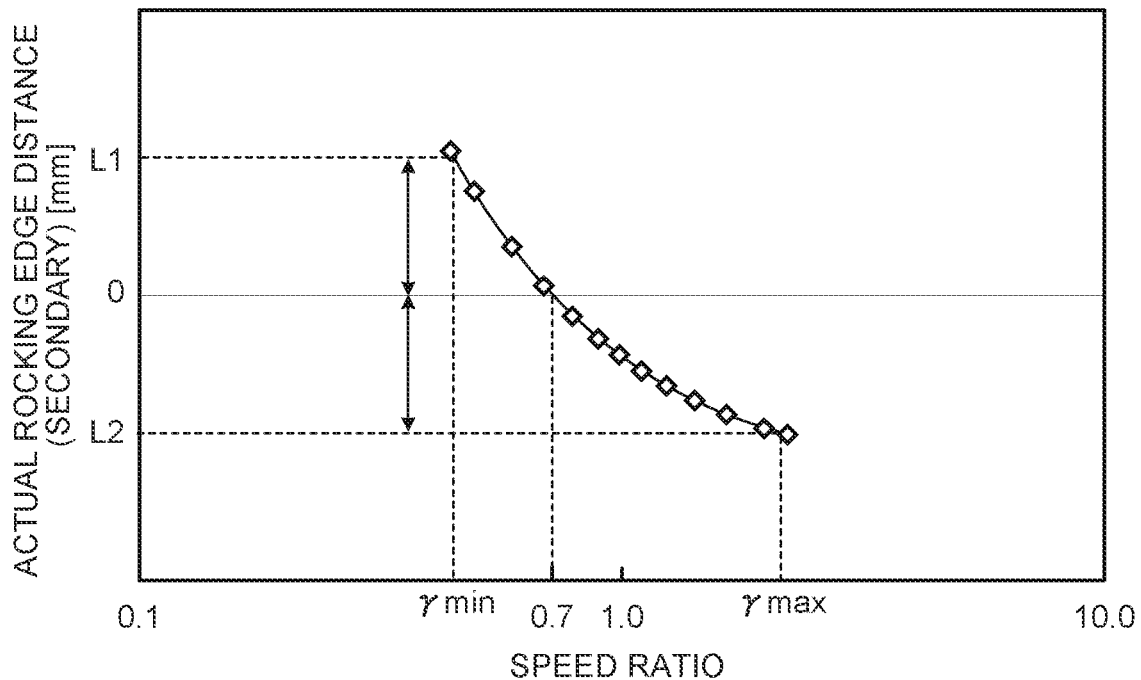
FIG. 10 illustrates the relationship between actual rocking edge distances and for a maximum speed ratio and a minimum speed ratio for model.

Here, the number of elements 20 wound around a small diameter pulley, which is one of the primary pulley 3 and the secondary pulley 5 with the smaller winding diameter, is smaller than the number of elements 20 wound around a large diameter pulley, which is one of the primary pulley 3 and the secondary pulley 5 with the larger winding diameter, and the range of a normal reaction received by the bind ring 11 from the elements 20 of the small diameter pulley is narrower than that for the large diameter pulley. Therefore, sliding tends to be caused between the bind ring 11 and the element 20 which is wound around the small diameter pulley, and a friction loss (reduction in transfer efficiency) tends to be generated therebetween. A situation in which the continuously variable transmission 1 is operating at a relatively low speed ratio of less than 1.0 (high-speed cruise operation) is considered. The secondary pulley 5 corresponds to the small diameter pulley. The energy efficiency (fuel efficiency) during high-speed cruise operation can be improved by designing the rocking edge portion 25 such that the actual rocking edge position of the element 20 which is wound around the secondary pulley 5 generally coincides with the reference rocking edge position. FIG. 10 illustrates the relationship between actual rocking edge distances L1 and L2 for a maximum speed ratio γmax and a minimum speed ratio γmin for model B. In the case where the rocking edge portion 25 of the element 20 for model B is designed, for example, the rocking edge portion 25 may be designed such that the actual rocking edge distance of the element 20 which is wound around the secondary pulley 5 (small diameter pulley) has a value of 0, that is, the actual rocking edge position coincides with the reference rocking edge position, when the speed ratio is about 0.7 as illustrated in FIG. 10. The winding diameter is varied, even if the speed ratio is the same, when the interaxial distance of the continuously variable transmission or the belt circumferential length is different. Therefore, the rocking edge portion 25 may be designed such that the actual rocking edge position coincides with the reference rocking edge position at a speed ratio generally in the range of 0.6 to 0.9 for each of the models as illustrated in FIG. 9, for example.

As illustrated in FIG. 10, the reference rocking edge position may be set such that the absolute value of an actual rocking edge distance L1 of the element 20 which is wound around the secondary pulley 5 at a minimum speed ratio γmin of a speed ratio range used by the continuously variable transmission 1 and the absolute value of an actual rocking edge distance L2 of the element 20 which is wound around the secondary pulley 5 at a maximum speed ratio γmax of the speed ratio range generally coincide with each other. In other words, the reference rocking edge position may be set so as to generally coincide with an intermediate position between an actual rocking edge position of the element 20 which is wound around the secondary pulley 5 at the minimum speed ratio γmin and an actual rocking edge position of the element 20 which is wound around the secondary pulley 5 at the maximum speed ratio γmax. Consequently, it is possible to enhance the transfer efficiency of the transfer belt 10 at an intermediate speed ratio between the maximum speed ratio γmax and the minimum speed ratio γmin.

In the present embodiment, as illustrated in FIG. 2, the rocking edge portion 25 is formed as divided into two at both end portions in the width direction on both sides of the position of the saddle surface 21a. The saddle surface 21a (center portion in the width direction) of the element 20 forms a non-contact portion 25a that has a reduced plate thickness compared to both end portions in the axial direction and that does not contact an adjacent element 20. Both end portions of the non-contact portion 25a are each formed so as to be connected to the rocking edge portion 25 in a tapered manner in order to prevent hitting at a boundary portion between the non-contact portion 25a and the rocking edge portion 25. The non-contact portion 25a can be formed by pressing, cutting, or the like, for example. The non-contact portion 25a is formed on the same surface as a surface of the element 20 on which the projecting portion 26 is formed. Therefore, it is possible to place the back side of the element 20, on which no projecting portion 26 is provided, on a flat surface to be fixed thereto, enhancing the workability for forming the non-contact portion 25a by pressing, cutting, or the like.

Figure 11A:
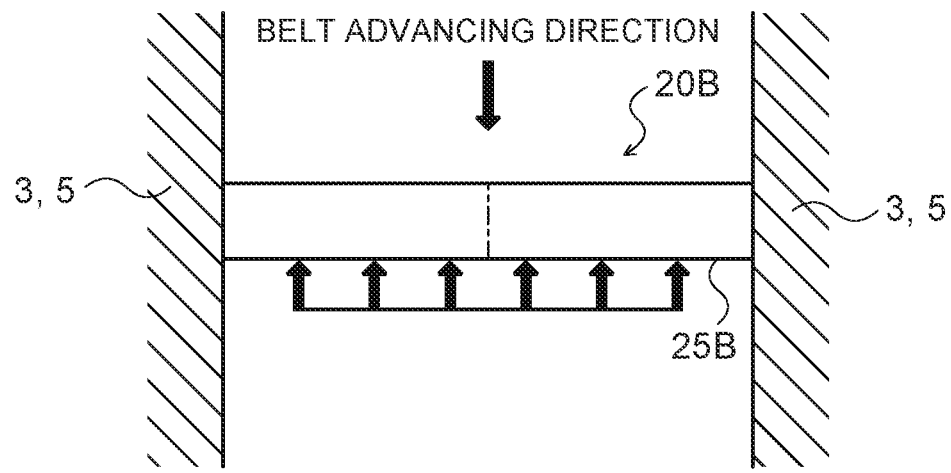
FIG. 11A illustrates the range of a load received by each element from an element on the front side in an example according to the related art.
Figure 11B:
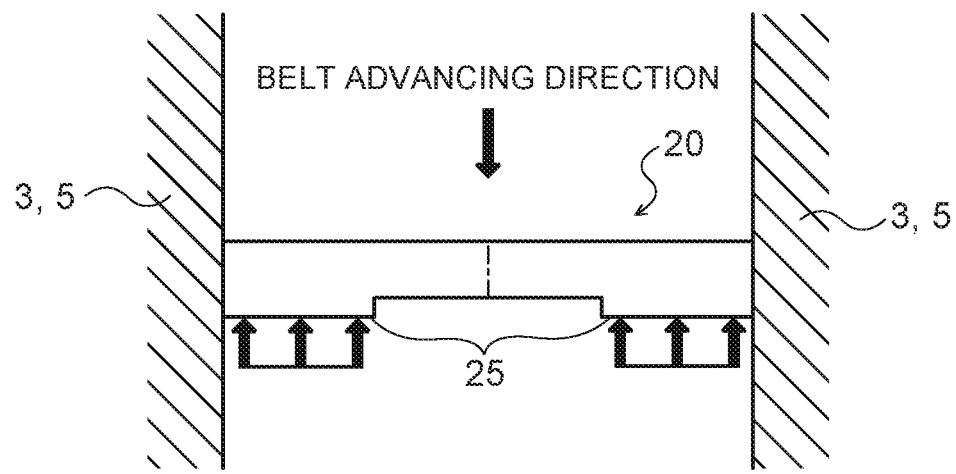
FIG. 11B illustrates the range of a load received by each element from an element on the front side in the present embodiment.

The element 20 transfers power by pressing an element on the front side with the rocking edge portion 25 using a friction force in the tangential direction (tangential force) between the pulley and the element 20 while the pair of side surfaces 28 are compressed by the pulley. Therefore, the rocking edge portion 25 receives a load that matches the tangential force from an element on the front side. FIGS. 11A and 11B illustrate the range of a load received by each of the elements from an element on the front side. FIG. 11A illustrates the range of a received load for a case where an element 20B according to a comparative example is used. FIG. 11B illustrates the range of a received load for a case where the element 20 according to the present embodiment is used. In the element 20B according to the comparative example, a rocking edge portion 25B is formed over the entire element 20B in the width direction including the center portion, that is, the non-contact portion 25a is not formed at the center portion. In the element 20B according to the comparative example, as illustrated in FIG. 11A, a load from an element on the front side is received by the entire element in the width direction including the center portion. In the element 20 according to the present embodiment, as illustrated in FIG. 11B, a load from an element on the front side is received by both end portions of the element in the width direction excluding the center portion. In each of the elements 20, the pair of side surfaces 28 are compressed by the pulley (the primary pulley 3 or the secondary pulley 5). Thus, as the element 20 receives a load from an element on the front side at a position farther from the pair of side surfaces 28, that is, at a position closer to the center portion in the width direction, a larger moment acts to increase the amount of deformation. In the element 20B according to the comparative example, a load from an element on the front side is received at the center portion, and therefore the amount of deformation at the center portion due to a moment is increased. In the element 20 according to the present embodiment, in contrast, a load from an element on the front side is not received at the center portion, and therefore the amount of deformation due to a moment can be reduced.

The transfer belt 10 according to the present embodiment described above is constituted by annularly binding the plurality of elements 20 using the bind ring 11. Each of the elements 20 has the body portion 21 which includes the saddle surface 21a and the pair of pillar portions 22 which extend toward the radially outer side from both sides of the saddle surface 21a. In the transfer belt 10, the saddle surface 21a which contacts the inner peripheral surface of the bind ring 11 is formed in a crowning shape (convex curved surface), and the rocking edge portion 25 which serves as a support point for turning motion of the element 20, which is wound around the pulley, in contact with an adjacent element 20 is formed in an arcuate shape as viewed in a side view, and so as to be positioned on a virtual line that extends in the width direction through the top portion of the saddle surface 21a as viewed in plan. Consequently, the sliding speed (relative speed difference) of sliding caused between the top portion of the saddle surface 21a and the bind ring 11 at the top portion of the saddle surface 21a can be reduced. As a result, the transfer efficiency of the transfer belt 10 including the elements 20 in which the saddle surface 21a is formed as a convex curved surface can be further improved.

In the transfer belt 10 according to the present embodiment, in addition, the reference rocking edge position is set such that the actual rocking edge position of the element 20 which is wound around the secondary pulley 5 generally coincides with the reference rocking edge position when the continuously variable transmission 1 is operating with a predetermined speed ratio (e.g. 0.6 to 0.9) that is lower than 1.0. Consequently, the energy efficiency (fuel efficiency) can be improved by enhancing the transfer efficiency of the transfer belt 10 during high-speed cruise operation.

In the transfer belt 10 according to the present embodiment, further, the reference rocking edge position is set such that an intermediate position between the actual rocking edge position of the element 20 which is wound around the secondary pulley 5 at the minimum speed ratio γmin in the speed ratio range which is used by the continuously variable transmission 1 and the actual rocking edge position of the element 20 which is wound around the secondary pulley 5 at the maximum speed ratio γmax of the speed ratio range generally coincides with the reference rocking edge position. Consequently, the transfer efficiency of the transfer belt 10 can be enhanced at an intermediate speed ratio between the maximum speed ratio γmax and the minimum speed ratio γmin.

In the transfer belt 10 according to the present embodiment, in addition, the rocking edge portion 25 is formed in each of the elements 20 which are bound annularly by the bind ring 11 so that the element 20 contacts an adjacent element at both end portions in the width direction by forming the non-contact portion 25a so that the element 20 does not contact an adjacent element at the center portion in the width direction. Consequently, the element 20 does not receive a load from an adjacent element at the center portion in the width direction on which a large moment acts. Therefore, deformation of the element 20 can be suppressed, and hence the durability of the element 20 can be improved.

In the present embodiment, the bind ring 11 is formed in a convex curved surface (crowning shape) curved convexly in the width direction. However, the bind ring 11 may be formed as a flat surface that is horizontal in the width direction.

In the present embodiment, the saddle surface 21a is formed as a convex curved surface curved convexly with the center portion in the width direction as the top portion. However, the saddle surface 21a may be formed as a wavy curved surface that has a plurality of projecting portions. In this case, the rocking edge portion 25 may be formed so as to be positioned on a virtual line that extends in the width direction through the highest one of the top portions of the wavy curved surface as viewed in plan.

In the present embodiment, the reference rocking edge position is determined such that an intermediate position between the actual rocking edge position of the element 20 which is wound around the secondary pulley 5 at the minimum speed ratio γmin and the actual rocking edge position of the element 20 which is wound around the secondary pulley 5 at the maximum speed ratio γmax generally coincides with the reference rocking edge position. However, the reference rocking edge position may be closer to the actual rocking edge position than an intermediate position between the actual rocking edge positions. In this case, a point of operation of the continuously variable transmission 1 at which the transfer efficiency of the transfer belt 10 is high can be further shifted toward the higher speed side.

Figure 12A:
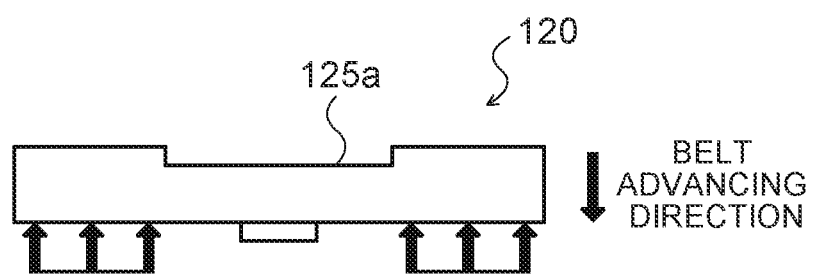
FIGS. 12A and 12B illustrate a schematic configuration of elements, respectively, according to other embodiments.
Figure 12B:
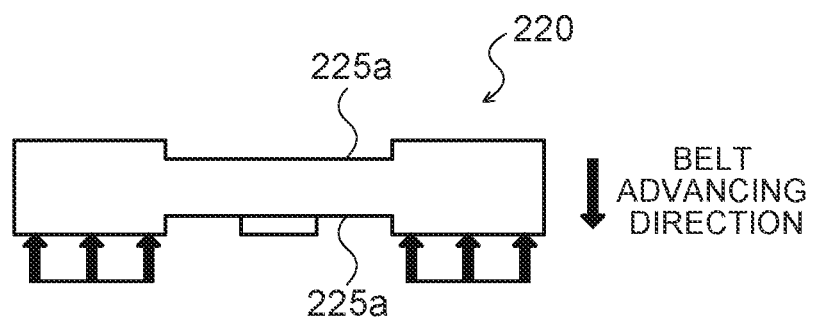

In the present embodiment, the non-contact portion 25a (rocking edge portion 25) and the projecting portion 26 are formed on a surface of the element 20 on the front side in the belt advancing direction. However, a non-contact portion 125a may be formed on a surface on the rear side in the belt advancing direction as in an element 120 according to another embodiment illustrated in FIG. 12A, and a non-contact portion 225a may be formed on both a surface on the front side and a surface on the rear side in the belt advancing direction as in an element 220 according to another embodiment illustrated in FIG. 12B.

As has been described above, the present disclosure provides a transfer belt (10) wound between a primary pulley (3) and a secondary pulley (5) of a continuously variable transmission (1), including: a plurality of elements (20), each of which has a body portion (21) that includes a saddle surface (21a) and a pair of pillar portions (22) that extend toward a radially outer side of the transfer belt (10) from both sides of the saddle surface (21a) in a width direction; and a bind ring (11) that binds the plurality of elements (20) annularly with an inner peripheral surface of the bind ring (11) contacting the saddle surface (21a) of each of the plurality of elements (20). In the transfer belt (10), the saddle surface (21a) is formed as a convex curved surface curved convexly toward the radially outer side of the transfer belt (10), a rocking edge portion (25) is formed in both the pair of pillar portions (22) so as to extend in the width direction and serve as a support point during turning motion of the element (20) in contact with an adjacent element (20), the rocking edge portion (25) has a width in a radial direction of the transfer belt (10), and a top portion of the convex curved surface of the saddle surface (21a) is formed so as to be positioned in a range of the width of the rocking edge portion (25) in the radial direction.

That is, the saddle surface (21a) which is contacted by the inner peripheral surface of the bind ring (11) is formed as a convex curved surface curved convexly toward the radially outer side of the transfer belt (10), and the rocking edge portion (25) which serves as a support point for turning motion of the element (20) is formed so as to have a width in the radial direction of the transfer belt (10). The top portion of the convex curved surface of the saddle surface is formed so as to be positioned in the range of the width of the rocking edge portion (25) in the radial direction. In the case where the saddle surface (21*a*) is formed as a convex curved surface, a normal reaction received by the bind ring (11) from the saddle surface (21*a*) of the element (20) which is wound around the primary pulley (3) or the secondary pulley (5) is maximum at the top portion of the convex curved surface, and thus the friction force between the saddle surface (21*a*) and the inner peripheral surface of the bind ring (11) is also maximum at the top portion of the convex curved surface. Therefore, if the bind ring (11) slips at the top portion of the saddle surface (21*a*), the friction loss is increased to degrade the transfer efficiency of the transfer belt. In the transfer belt (10) according to the present disclosure, the rocking edge portion (25) is formed so as to have a width in the radial direction of the transfer belt (10), and the top portion of the convex curved surface of the saddle surface is formed so as to be positioned in the range of the width of the rocking edge portion (25) in the radial direction. Therefore, sliding between the top portion of the saddle surface (21*a*) and the bind ring (11) can be reduced. As a result, the transfer efficiency of the transfer belt (10) can be further improved.

In the transfer belt according to the present disclosure, the rocking edge portion (25) may be divided to be located at both ends in the width direction by a non-contact portion (25*a*) provided at a center portion in the width direction. With such a configuration, the element (20) does not receive a load from a different adjacent element (20) at the center portion in the width direction on which a large moment acts. Therefore, deformation of the element (20) can be suppressed. Consequently, it is possible to secure the durability of the element (20) even if the top portion of the convex curved surface of the saddle surface is formed so as to be positioned in the range of the width of the rocking edge portion (25) in the radial direction.

In the transfer belt according to the present disclosure, in addition, the rocking edge portion (25) may be formed in an arcuate shape as viewed in a side view; and the top portion may be positioned in a range of the arcuate shape in the radial direction. In the transfer belt according to the present disclosure, in addition, the rocking edge portion (25) may be formed so as to generally overlap a virtual line that extends in the width direction of the element (20) through the top portion as viewed in a plan view of the element (20). In this case, the rocking edge portion (25) may be formed in an arcuate shape as viewed in a side view, and the arcuate shape may be formed at a position overlapping the virtual line as viewed in the plan view.

In the transfer belt according to the present disclosure in an aspect in which the rocking edge portion is formed in an arcuate shape as viewed in a side view, the rocking edge portion (25) may be formed such that an intermediate position between a first support point for turning motion of the element (20) which is wound around the secondary pulley (5) at a minimum speed ratio of a speed ratio range used in operation of the continuously variable transmission (1) and a second support point for turning motion of the element (20) which is wound around the secondary pulley (5) at a maximum speed ratio of the speed ratio range, or a predetermined position that is closer to the first support point than the intermediate position, generally coincides with a position of the top portion in the radial direction. With such a configuration, the transfer efficiency of the transfer belt (10) can be enhanced at an intermediate speed ratio between the maximum speed ratio and the minimum speed ratio, and the transfer efficiency of the transfer belt (10) can be enhanced at a speed ratio on the higher speed side than the intermediate speed ratio.

In the transfer belt according to the present disclosure in an aspect in which the rocking edge portion is formed in an arcuate shape as viewed in a side view, in addition, the rocking edge portion (25) may be formed such that a position of a support point for turning motion of the element (20) which is wound around the secondary pulley (5) of the continuously variable transmission (1) at a predetermined speed ratio, at which a rotational speed of the secondary pulley (5) is increased compared to a rotational speed of the primary pulley (3), generally coincides with a position of the top portion in the radial direction. With such a configuration, the energy efficiency (fuel efficiency) during high-speed cruise operation can be improved in a vehicle on which the continuously variable transmission is mounted, for example. Here, the predetermined speed ratio may be a speed ratio in a range of 0.6 to 0.9.

In the transfer belt according to the present disclosure, in addition, the bind ring may be a single ring-shaped member formed by stacking a plurality of band-like rings in the radial direction; and the convex curved surface may be formed such that a center in the width direction of the saddle surface projects most.

While embodiments of the disclosure according to the present disclosure have been described above, it is a matter of course that the disclosure according to the present disclosure is not limited to the embodiments in any way, and that the disclosure according to the present disclosure may be implemented in various forms without departing from the scope and spirit of the disclosure according to the present disclosure.

INDUSTRIAL APPLICABILITY

The disclosure according to the present disclosure is applicable to the continuously variable transmission and transfer belt manufacturing industry, etc.

The invention claimed is:

1. A transfer belt wound between a primary pulley and a secondary pulley of a continuously variable transmission, the transfer belt comprising:
   a plurality of elements, each of which has a body that includes a saddle surface and a pair of pillars that extend toward a radially outer side of the transfer belt from both sides of the saddle surface in a width direction; and
   a bind ring that binds the plurality of elements annularly with an inner peripheral surface of the bind ring contacting the saddle surface of each of the plurality of elements, wherein:
      the saddle surface is formed as a convex curved surface curved convexly toward the radially outer side of the transfer belt;
      a rocking edge is formed in both pair of pillars of each of the plurality of elements so as to extend in the width direction and serve as a support point during turning motion of an element in contact with an adjacent element;
      the rocking edge has a width in a radial direction of the transfer belt;

a top of the convex curved surface of the saddle surface is formed so as to be positioned in a range of the width of the rocking edge in the radial direction;

the rocking edge is formed in an arcuate shape as viewed in a side view;

the top of the convex curved surface of the saddle surface is positioned in a range of the arcuate shape in the radial direction;

the rocking edge is formed at an intermediate position that is at a same radial height as the top of the convex curved surface of the saddle surface, the intermediate position being halfway between a first support position for turning motion of the element which is wound around the secondary pulley at a minimum speed ratio of a speed ratio range used in operation of the continuously variable transmission and a second support position for turning motion of the element which is wound around the secondary pulley at a maximum speed ratio of the speed ratio range;

the bind ring is a single ring-shaped member formed by stacking a plurality of band-like rings in the radial direction;

the convex curved surface is formed such that a center in the width direction of the saddle surface projects most; and the bind ring curves convexly toward the radially outer side of the transfer belt.

2. The transfer belt according to claim 1, wherein the rocking edge is divided to be located at both ends in the width direction by a non-contact portion provided at a center in the width direction.

3. The transfer belt according to claim 1, wherein the rocking edge is formed so as to overlap a virtual line that extends in the width direction of the element through the top of the convex curved surface of the saddle surface as viewed in a plan view of the element.

4. The transfer belt according to claim 3, wherein the arcuate shape of the rocking edge is formed at a position overlapping the virtual line as viewed in the plan view.

5. A transfer belt wound between a primary pulley and a secondary pulley of a continuously variable transmission, the transfer belt comprising:

a plurality of elements, each of which has a body that includes a saddle surface and a pair of pillars that extend toward a radially outer side of the transfer belt from both sides of the saddle surface in a width direction; and a bind ring that binds the plurality of elements annularly with an inner peripheral surface of the bind ring contacting the saddle surface of each of the plurality of elements, wherein:

the saddle surface is formed as a convex curved surface curved convexly toward the radially outer side of the transfer belt;

a rocking edge is formed in both pair of pillars of each of the plurality of elements so as to extend in the width direction and serve as a support point during turning motion of an element in contact with an adjacent element;

the rocking edge has a width in a radial direction of the transfer belt;

a top of the convex curved surface of the saddle surface is formed so as to be positioned in a range of the width of the rocking edge in the radial direction;

the rocking edge is formed in an arcuate shape as viewed in a side view;

the top of the convex curved surface of the saddle surface is positioned in a range of the arcuate shape in the radial direction;

the rocking edge is formed at a predetermined position that is at a same radial height as the top of the convex curved surface of the saddle surface, the predetermined position is closer to a first support position for turning motion of the element which is wound around the secondary pulley at a minimum speed ratio of a speed ratio range used in operation of the continuously variable transmission than to an intermediate position that is halfway between the first support position and a second support position for turning motion of the element which is wound around the secondary pulley at a maximum speed ratio of the speed ratio range;

the bind ring is a single ring-shaped member formed by stacking a plurality of band-like rings in the radial direction;

the convex curved surface is formed such that a center in the width direction of the saddle surface projects most; and the bind ring curves convexly toward the radially outer side of the transfer belt.

6. The transfer belt according to claim 5, wherein the rocking edge is divided to be located at both ends in the width direction by a non-contact portion provided at a center in the width direction.

7. The transfer belt according to claim 5, wherein the rocking edge is formed so as to overlap a virtual line that extends in the width direction of the element through the top of the convex curved surface of the saddle surface as viewed in a plan view of the element.

8. The transfer belt according to claim 7, wherein the arcuate shape of the rocking edge is formed at a position overlapping the virtual line as viewed in the plan view.

* * * * *